April 20, 1965

N. P. WORDEN 3,179,463

PIVOTAL MOUNTING

Filed Sept. 20, 1961

INVENTOR.
Norbert P. Worden
BY
Harness, Dickey & Pierce
ATTORNEYS.

April 20, 1965     N. P. WORDEN     3,179,463
PIVOTAL MOUNTING
Filed Sept. 20, 1961     3 Sheets-Sheet 2
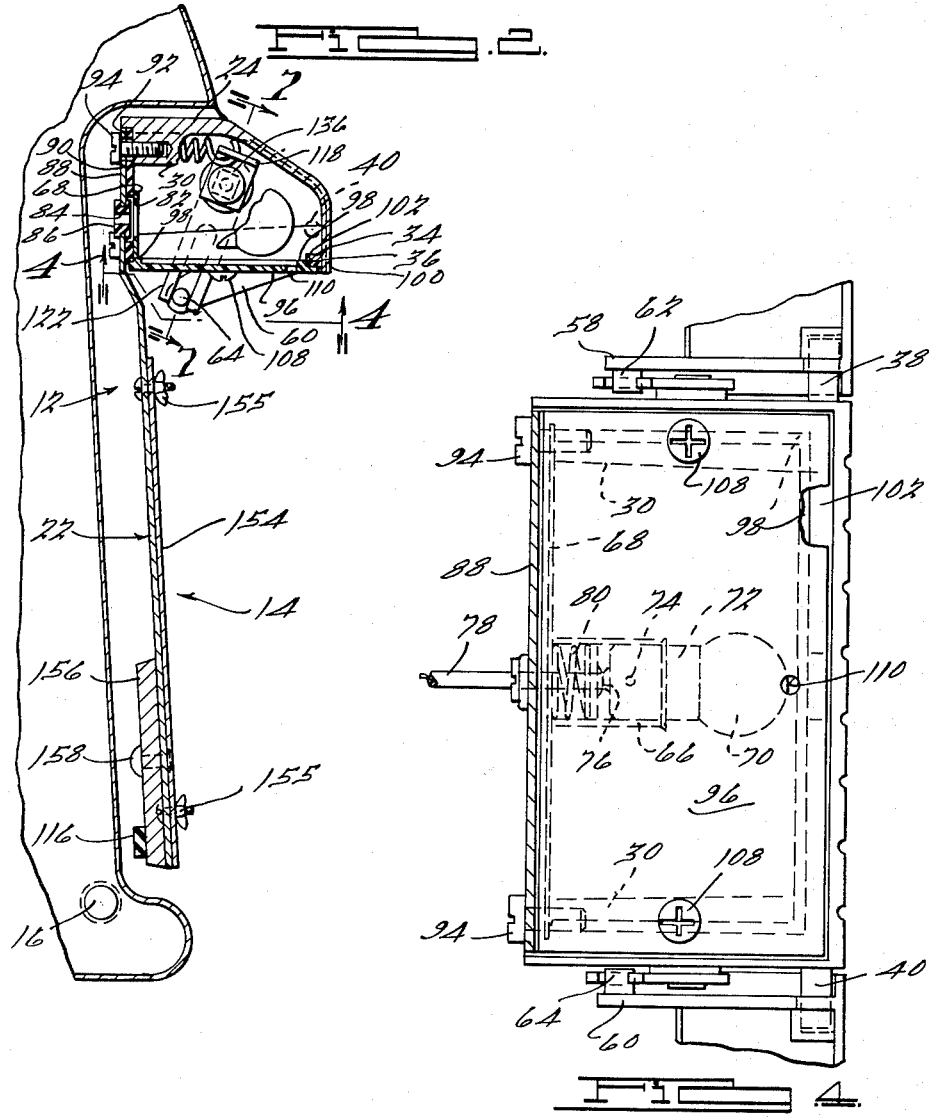
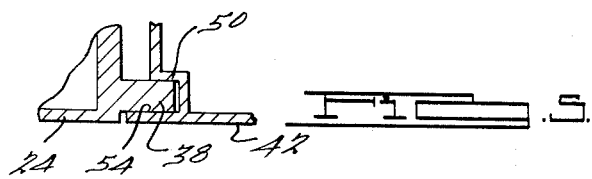
INVENTOR.
Norbert P. Worden
BY
Harness, Dickey & Pierce
ATTORNEYS

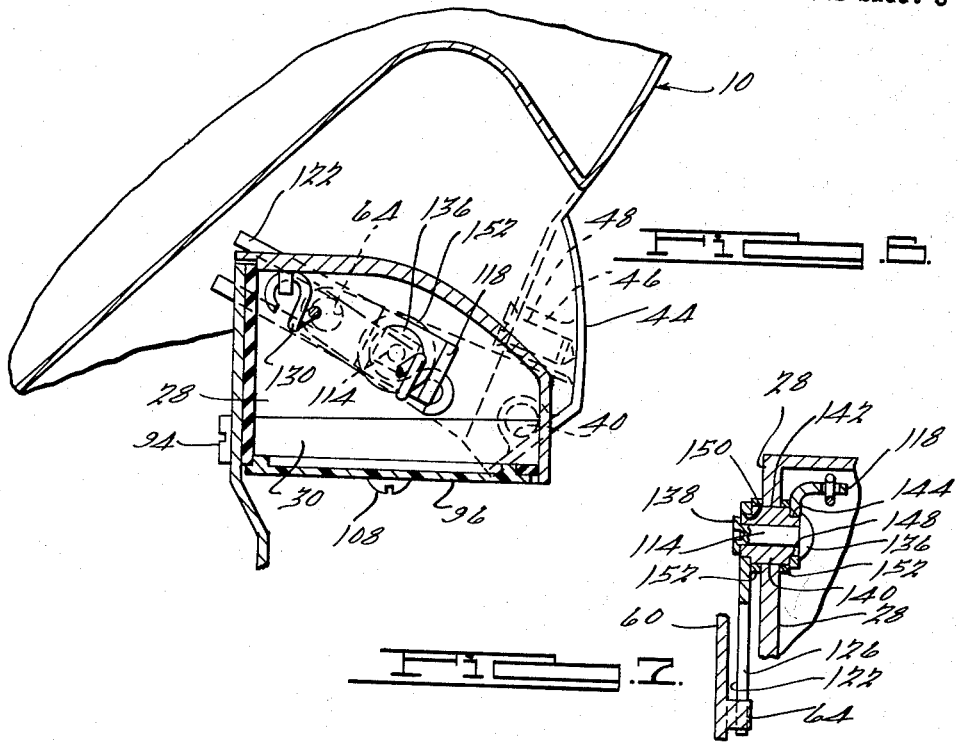
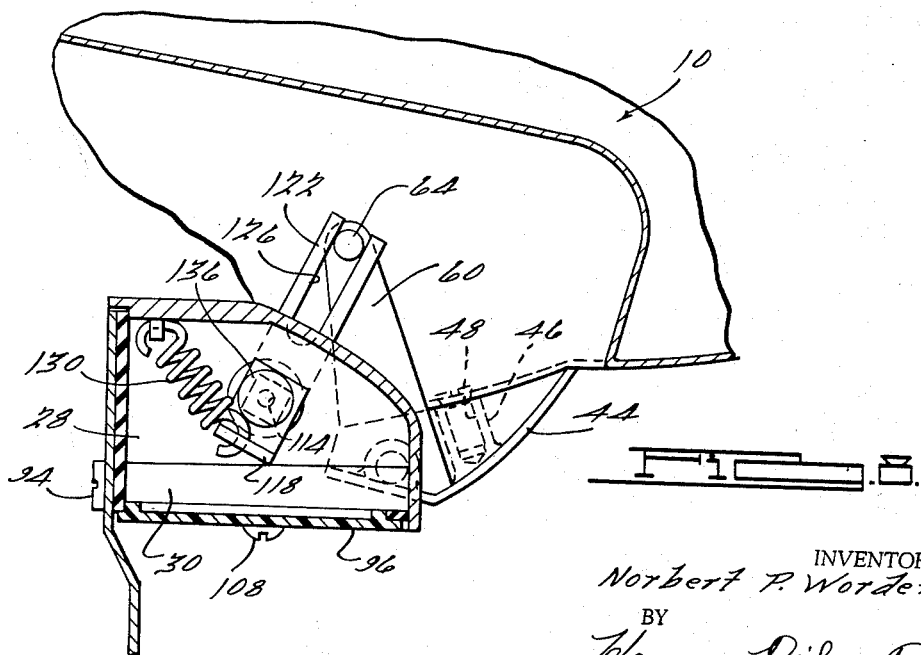

United States Patent Office 3,179,463
Patented Apr. 20, 1965

3,179,463
PIVOTAL MOUNTING
Norbert P. Worden, Detroit, Mich., assignor to C. M. Hall Lamp Company, Detroit, Mich., a corporation of Michigan
Filed Sept. 20, 1961, Ser. No. 139,412
6 Claims. (Cl. 296—57)

This invention relates in general to means for pivotally mounting a member on a movable supporting structure so that the member can be maintained in an upright and readily viewable position regardless of the position of the supporting structure. More particularly, the invention concerns a pivotal mounting for an assembly of a license plate holder and a license plate illuminating lamp wherein the assembly is to be mounted on a pivotal vehicle tailgate which is pivotal from a substantially upright closed position to a substantially horizontal open position.

The pivotal mounting of the present invention is of such construction that it allows the license plate holder and lamp assembly to pivot on the tailgate and maintain its upright and viewable position when the tailgate is pivoted between its closed and opened positions. This upright position of the license plate is desirable in that it may be readily viewed and the lettering and numerals thereon easily read regardless of the position of the tailgate.

A principal object of this invention is to provide a relatively simple and inexpensive but effective pivotal mounting for a license plate holder and lamp assembly, and to provide improved structure of the assembly itself so that it will automatically pivot on the vehicle tailgate as the tailgate is moved between its closed and opened positions.

Another object is to provide force-applying means on the assembly which functions to urge the assembly to either of two extreme angular positions relative to the tailgate to thereby inhibit undesirable movement of the assembly.

Another object is to provide spring operable overcentering positioning means on the assembly for urging the same to either of two extreme angular positions relative to the tailgate.

Another object is to provide weight means on the lower portion of the above assembly to locate its center of gravity substantially below the pivot point thereof to provide sufficient moment for the assembly to cause it to pivot to its extreme angular positions relative to the tailgate.

A further object is to provide mounting base portions on the above assembly for mounting the same in a well or recess in a vehicle tailgate.

Further objects, advantages and novel features of the invention will become apparent from the following description taken in conjunction with the drawings wherein:

FIGURE 2 is a cross-sectional view of the structure of FIGURE 1 taken along the line 2—2 thereof in the direction of the arrows;

FIGURE 4 is a view of the license plate holder and lamp assembly taken along the line 4—4 of FIGURE 2 in the direction of the arrows with portions broken away;

FIGURE 5 is a cross-sectional view of a pivot portion of the assembly taken along the line corresponding to 5—5 of FIGURE 3 in the direction of the arrows;

FIGURE 6 is a view of the assambly of FIGURE 3 mounted on a tailgate and taken along the line corresponding to 6—6 thereof in the direction of the arrows with portions broken away to show the overcentering structure;

FIGURE 7 is a cross-sectional view of the overcentering positioning structure of FIGURE 2 taken along the line corresponding to 7—7 thereof in the direction of the arrows; and FIGURE 8 is a plan view of the overcentering positioning structure of FIGURE 6 in the other of its two extreme positions.

Figure 1:
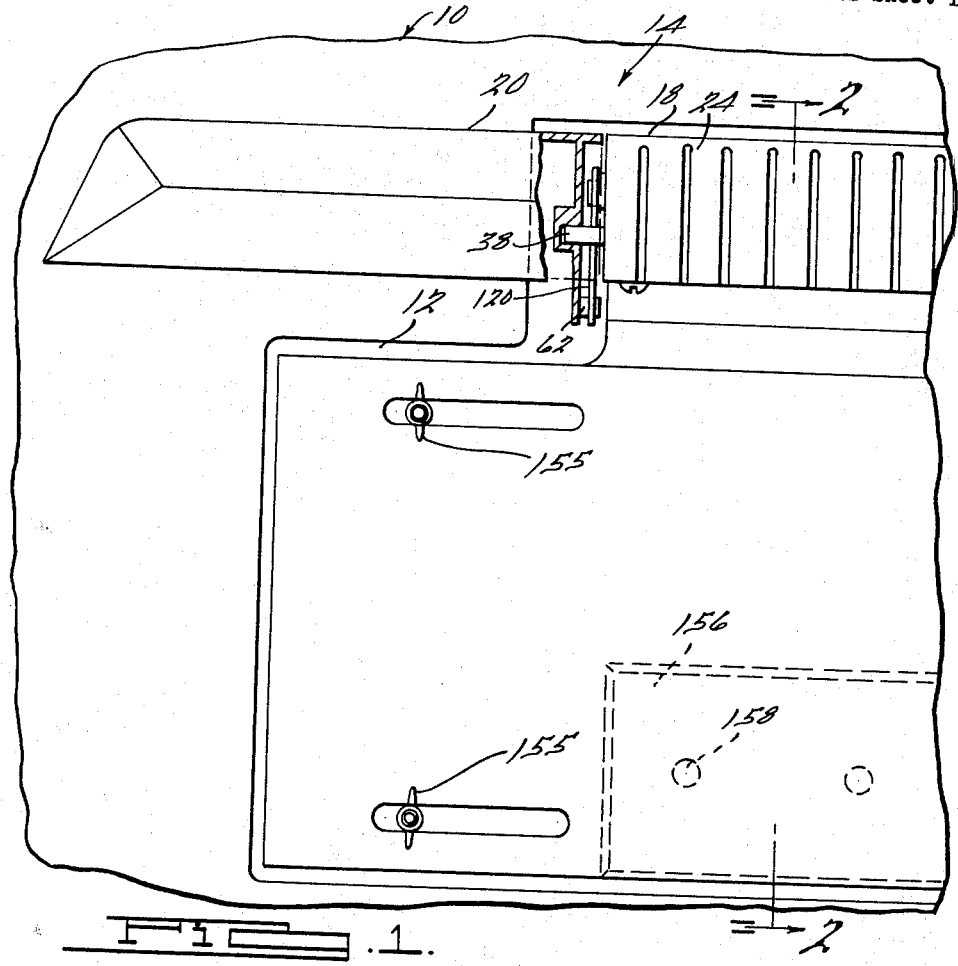
FIGURE 1 is an elevational view of a portion of the tailgate of a vehicle having the license plate holder and lamp assembly mounted in a well or recess therein with portions broken away.
Figure 3:
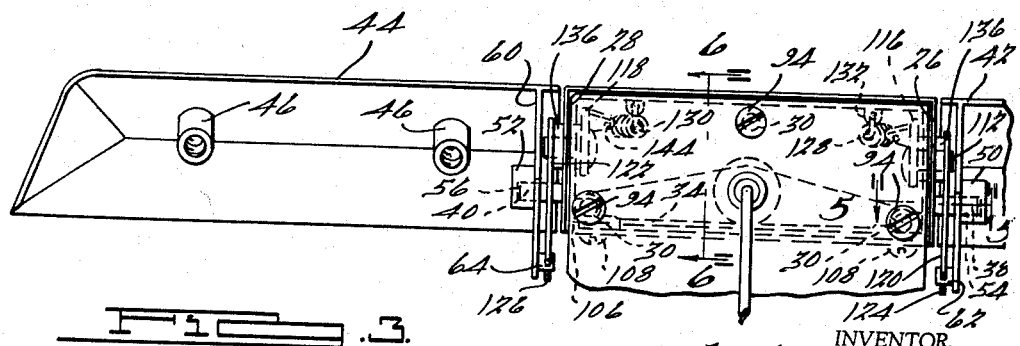
FIGURE 3 is a rear view of the license plate holder and lamp assembly.

Referring to the drawings, a suburban-type vehicle tailgate designated 10 is provided with a recess of well 12 and receives the license plate holder and lamp assembly designated 14. The shape of the well 12 shown in FIGURES 1 and 2 is merely representative of the shapes which could be employed and is not intended to limit the present invention. Tailgate 10 may be pivotally mounted at its lower portion to a vehicle body by such means as a pivot shaft 16 supported at its ends on either side of the vehicle body so that the tailgate may be pivotally moved from its upright or closed position shown in FIGURE 2 to a horizontal or open position shown in FIGURE 8. In accordance with the objects of this invention, assembly 14 is so mounted on the tailgate 10 in a manner hereinafter described that as the tailgate pivots in a clockwise direction from its upright position shown in FIGURE 2 to its horizontal position of FIGURE 8, assembly 14 will rotate on the tailgate and maintain its upright position so that the license plate will be readily viewable at all times.

Assembly 14 comprises a lamp assembly 18, an attaching base 20, and a license plate holder or bracket 22. Lamp assembly 18 comprises a metallic housing 24 which may be of one-piece cast construction having opposite ends 26 and 28. Screw-receiving bosses 30 are located at various places on the housing, and shoulder segments including segment 34 extend along the inside of the front portion 36 of the housing. Projections 38 and 40 extend outwardly from end portions 26 and 28 respectively, for a purpose to be hereinafter described. All of these portions may be integrally cast in a single operation to produce an inexpensive lamp housing.

A pair of mounting base portions 42 and 44 having a somewhat dished cross-sectional shape as shown in FIGURE 8 are each provided with a plurality of bosses 46 having threaded sockets 48 for receiving bolts or other threaded means which may extend through the tailgate 10 to secure base portions thereto. It is obvious that various means may be provided for attaching these base portions to a tailgate without departing from the scope of applicant's invention. These base portions are provided at their inner ends with bosses 50 and 52 having suitable bearing recesses 54 and 56 for rotatably receiving projections 38 and 40 respectively of the lamp housing 24 for providing a pivotal mounting therefor. These portions 42 and 44 are further provided with projections 58 and 60 having projections 62 and 64 respectively at their outer ends for purposes described below. Each of these base portions with all of their integral portions may also be formed in a single casting operation.

Lamp 18 further comprises a light bulb socket 66 secured to a plate 68 and receiving a bulb 70. The bulb 70 may be provided with a conventional base 72 having projections 74 which snap into a bayonet-type slot provided in the socket 66. Proper contact of the base 72 with the end 76 of a conductor 78 is insured by a spring 80 which firmly presses the conductor end 76 into engagement with the base 72. The conductor 78 extends through an aperture 82 in plate 68 and an aperture 84 in a grommet 86 which is tightly secured in the top portion 88 of the license plate holder or bracket 22. A gasket 90 of rubber or other suitable sealing material may be provided intermediate portion 88, plate 68, and shoulder portions 92 of the housing to provide a proper moisture seal when screws 94 are threaded tightly into the bosses 30.

A lens 96, preferably of transparent plastic material, is provided with a ridge 98 extending all the way around the top portion thereof to provide a sealing flange 100 also extending around the top portion of the lens. Flange 100 engages a gasket 102 on three sides of the flange and firmly presses the gasket against the shoulder portions including segment 34 in the front of the housing 24 and against shoulder portions including shoulder portion 106 at either end of the housing. The portion of ridge 98 and flange 100 at the rear of the lens engages the bottom portion of gasket 90 to complete the seal between the lens and the bottom of housing 24. The lens is secured to the housing 24 by screws 108 which are threaded into portions of the bosses 30 which extend across the lower portion of the housing 24 adjacent the ends thereof. It is seen, therefore, that the sealing of the lens and the upper portion 88 of the license plate holder onto the housing 24 is effectively accomplished. However, condensation may possibly occur in the housing 24 and in order to drain the condensate therefrom a small aperture 110 is provided in the front portion of the lens 96.

The overcentering positioning mechanism which urges the license plate holder of assembly 14 either toward the tailgate as shown in FIGURE 2, or away from the tailgate as shown in FIGURE 8 consists of right and left handed devices of essentially the same construction and respectively comprising shafts 112 and 114 rotatably extending through ends 26 and 28 respectively of housing 24. These shafts are provided with levers 116 and 118 secured to their inner ends, and are further provided with levers 120 and 122 secured to their outer ends. End portions of lever members 120 and 122 are provided with slots 124 and 126 respectively receiving projections 62 and 64 of base portions 42 and 44. Levers 116 and 118 are provided with springs 128 and 130 which extend toward the rear of the housing 24 and connect to eye means 132 and 134 respectively, cast on the inside of housing 24.

The shafts 112 and 114 are each conveniently provided in the form of a rivet having a head 136 and an upset end 138. The shank of each rivet is received in a metal bushing member 140 having a round center portion 142 rotatably supporting the rivets in the ends 26 and 28 of housing 24, and have squared end portions such as portion 144 non-rotatably received in squared apertures 148 and 150 in levers 118 and 122 respectively. It is obvious that any keying shape may be given to the end portions such as portion 144 and apertures 148 and 150. Washers 152 are located on bushing 140 to properly space the above members and allow proper rotation of bushing 140 in the ends of the housing.

In the operation of the overcentering positioning means, it is seen that when the tailgate 10 is in its upright position as shown in FIGURES 2 and 6 the springs 128 and 130 rotate their respective levers 116 and 118 and the associated levers 120 and 122 in a counterclockwise direction. This rotation of levers 120 and 122 causes them to abut the base portion projections 62 and 64 respectively and thereby produce a force tending to rotate the end portions 26 and 28 of the housing in a clockwise direction about their shaft portions 38 and 40 as viewed in FIGURES 2 and 6. The license plate holder or bracket 22 having the license plate 154 secured thereto by suitable bolt and nut means 155 and also the lamp housing 24, will thereby be positioned in the well or recess 12. As the tailgate 10 and the base portions 42 and 44 secured thereto are moved about the axis of the tailgate pivot shaft 16 in a clockwise direction to the position in FIGURE 8, the license plate holder 22 and lamp 18 will begin to rotate in a counterclockwise direction relative to the tailgate 10 about the pivot shafts 38 and 40 under the influence of a weight 156 which is of any suitable heavy material secured as by rivets 158 to the lower portion of the license plate holder 22. Weight 156 effectively lowers the center of gravity of the assembly 14 so that pivoting thereof may readily occur against the force of springs 128 and 130 when the tailgate begins to swing downwardly in a clockwise direction. As the assembly 14 pivots in a counterclockwise direction relative to the tailgate 10, the ends of levers 120 and 122 as viewed in FIGURES 2 and 6 will be held by projections 62 and 64 so that the distance between the levers 116 and 118 and their respective spring eyes 132 and 134 will be increased to further tension the springs 128 and 130.

The operation of the overcentering positioning devices as they move across their overcenter positions during the pivoting of the tailgate and assembly 14 will now be described with reference to the left-handed device shown in FIGURE 6. As the end 28 of the lamp housing 24 pivots about 40 in a counterclockwise direction in response to the downward clockwise motion of the tailgate, the projection 64, shaft 114, and projection 144 on lever 118 to which an end of the spring 128 is connected will become aligned as shown in FIGURE 6, and as further downward motion of the tailgate occurs, an overcentering will occur and the spring 128 will then urge the levers 118 and 122 in a clockwise direction and the lamp 18 in a counterclockwise pivotal motion about its pivot shafts 38 and 40 to position the lamp 18 and license plate holder 22 in a downwardly extending position with respect to the tailgate 10 as shown in FIGURE 8. In this position the license plate 154 may readily be viewed when the tailgate is in its open position. In order to prevent the holder 22 from striking the tailgate portion within the well 12, a rubber stop 160 may be provided conveniently on the rear side of weight 156 adjacent well 12. The weight 156 is sufficiently heavy to maintain the holder 22 in its downward position in FIGURE 8. It is noted that the springs 128 and 130 are sufficiently heavy to positively position the lamp 18 and holder 22 in the two positions shown in FIGURES 2 and 8.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A pivotal mounting for a license plate holder and lamp assembly comprising cooperating pivot means on upper portions of said assembly and a vehicle tailgate pivotable relative to the vehicle, said pivot means allowing said assembly to pivot about a generally horizontal axis relative to said tailgate independently of pivot movement of the tailgate relative to the vehicle, spring operable overcentering positioning force applying means for urging said assembly to either one of two predetermined angular positions relative to said tailgate, and weight means on said assembly centered below said generally horizontal axis and providing sufficient moment thereto for overcoming the force of said force applying means as said tailgate is moved between its closed and opened positions.

2. A license plate holder and lamp assembly having means thereon for pivotally mounting the upper portion of said assembly on a pivotable vehicle tailgate for pivotal movement relative to the tailgate independently of pivotal movement of the tailgate relative to the vehicle, said means being located above the center of gravity of said assembly so that said assembly will change its angular relationship with respect to the vehicle tailgate as said tailgate is angularly moved, and spring operable overcentering positioning means on said assembly for urging the same to either one of two extreme angular positions with respect to the tailgate.

3. In a license plate holder and lamp assembly wherein the lamp is secured to the upper portion of the holder, means proximate to the upper portion of said assembly for supporting the same on a pivotable vehicle tailgate for pivotal movement about a generally horizontal axis relative thereto independently of pivotal movement of the tailgate relative to the vehicle, weight means on a lower portion of said holder and below said axis to provide a substantial moment for automatically pivoting said assembly as the tailgate is angularly moved, and spring operable overcentering positioning means for urging said assembly to either of two angular positions relative to the tailgate.

4. In a license plate holder assembly for association with a vehicular tailgate pivotable about a horizontal axis between generally vertical closed and generally horizontal open positions, the combination of cooperating pivot means on said assembly and on the tailgate for supporting said assembly for pivotal movement relative to the tailgate about a generally horizontal axis between a first extreme position in which the license plate is generally parallel with the tailgate and a second extreme position in which the license plate is generally normal to the tailgate, spring means for exerting a biasing force tending to pivot said assembly about said axis relative to the tailgate and overcentering means including said spring means effective during pivotal movement of said assembly relative to the tailgate for changing the direction of said biasing force for spring-biasing said assembly toward said first and second extreme positions as said assembly is pivotally moved toward said first and second extreme positions, respectively.

5. In a license plate holder assembly for association with a vehicular tailgate pivotable about a horizontal axis between generally vertical closed and generally horizontal open positions, the combination of cooperating pivot means on said assembly and on the tailgate for supporting said assembly for pivotal movement relative to the tailgate independently of pivotal movement of the tailgate relative to the vehicle about a generally horizontal axis between a first extreme position in which the license plate is generally parallel with the tailgate and a second extreme position in which the license plate is generally normal to the tailgate, spring means for exerting a biasing force tending to pivot said assembly about said axis relative to the tailgate and overcentering means including said spring means effective during pivotal movement of said assembly relative to the tailgate for changing the direction of said biasing force for spring-biasing said assembly toward said first and second extreme positions as said assembly is pivotally moved toward said first and second extreme positions, respectively.

6. In a license plate holder assembly for association with a vehicular tailgate pivotable about a horizontal axis between generally vertical closed and generally horizontal open positions, the combination of cooperating pivot means on said assembly and on the tailgate for supporting said assembly for pivotal movement relative to the tailgate independently of pivotal movement of the tailgate relative to the vehicle about a generally horizontal axis between a first extreme position in which the license plate is generally parallel with the tailgate and a second extreme position in which the license plate is generally normal to the tailgate, spring means for exerting a biasing force tending to pivot said assembly about said axis relative to the tailgate, overcentering means including said spring means effective during pivotal movement of said assembly relative to the tailgate for changing the direction of said biasing force for spring-biasing said assembly toward said first and second extreme positions as said assembly is pivotally moved toward said first and second extreme positions, respectively, and means for forcing said assembly to pivot about said axis between said extreme positions in response to pivotal movement of the tailgate relative to the vehicle comprising weight means for establishing the center of gravity of the pivotal portion of said assembly below said axis.

References Cited by the Examiner

UNITED STATES PATENTS

| | | | |
|---|---|---|---|
| 1,740,772 | 12/29 | Kuhlman | 296—56 |
| 2,310,416 | 2/43 | Galamb | 296—57 |
| 2,964,350 | 12/60 | Fuqua | 40—200 X |
| 2,964,351 | 12/60 | White | 40—200 X |

A. HARRY LEVY, *Primary Examiner.*

EDWARD V. BENHAM, LEO FRIAGLIA, *Examiners.*